United States Patent Office 2,790,825
Patented Apr. 30, 1957

2,790,825 p-(AMINOETHOXY)BENZOIC ACIDS AND THEIR PREPARATION

John R. Caldwell and Winston J. Jackson, Jr., Kingsport, Tenn., assignors to Eastman Kodak Company, Rochester, N. Y., a corporation of New Jersey No Drawing. Application March 12, 1956,
Serial No. 570,676

6 Claims. (Cl. 260—519)

This invention relates to the synthesis of p-(aminoethoxy)benzoic acids and the production thereof and is particularly concerned with p-(2-aminoethoxy) benzoic acid and p-(2-(2-aminoethoxy)ethoxy)benzoic acid as new compounds and to their preparation.

Amino acids containing both a functional carboxyl group and a functional amino group are of value as bifunctional reactants for the preparation of linear polyamides and also are useful as intermediates in the manufacture of dyes, pharmaceuticals and other products.

It is accordingly an object of this invention to provide certain hitherto unknown p-(aminoethoxy)benzoic acids and specifically to provide amino acids of the formulas

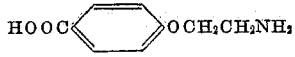

and

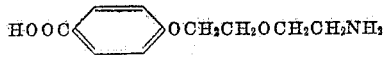

Another object of the invention is to provide a method of synthesis of such compounds which are useful in the formation of polyamides, dyes, pharmaceuticals, and the like.

These and other objects of the invention are attained by reacting an alkali metal salt of a hydrolyzable ester of p-hydroxybenzoic acid with an excess of a dihalide of the formula

wherein X represents a halogen atom and n is either 0 or 1, hydrolyzing the resulting haloethoxybenzoate to the corresponding haloethoxybenzoic acid, and reacting the haloethoxybenzoic acid with aqueous ammonia to form the desired p-(aminoethoxy)benzoic acid. When n is 0, that is, when the dihalide is an ethylene dihalide, the product obtained is p-(2-aminoethoxy)benzoic acid. When n is 1, that is, when the dihalide is a 2,2'-dihalodiethylether, the product of the reactions is p-(2-(2-aminoethoxy)ethoxy)benzoic acid.

In effecting the synthesis, any of the hydrolyzable esters of p-hydroxybenzoic acid can be initially converted to the alkali metal salt. The nature of the ester group does not affect the course of the reaction provided the group is hydrolyzable so that the free acid can be obtained in the hydrolysis step. Generally, the lower alkyl esters of p-hydroxybenzoic acid, i. e. those having 1–4 carbon atoms in the alkyl group, are preferred for convenience and ease of hydrolysis. These esters can be readily converted to the corresponding alkali metal salt in any of the well known ways for forming salts of hydroxy esters. A convenient method of forming the alkali metal salt is to react the p-hydroxybenzoate with an alkali metal alkoxide. The sodium salts are generally preferred, although the potassium and lithium salts can be used with equal facility.

The dihalide which is reacted with the alkali metal salt can be either an ethylene dihalide or a 2,2'-dihalodiethylether depending upon the chain length desired. The halogen in the dihalide can be any of the well known halogens with equally good results, although the dichlorides and dibromides are preferred. Thus, for example, ethylene dibromide, ethylene dichloride, 2,2'-dichlorodiethyl ether, and 2,2'-dibromodiethyl ether can be used with equal facility.

The haloethoxybenzoates which result from reaction of the dihalide with the alkali metal salt is hydrolyzed to the free acid by water, and preferably by the use of water containing an inorganic acid such as sulfuric acid. Acetic acid is conveniently employed in the hydrolysis mixture so that an alkyl acetate is formed which can be continuously removed during the course of the hydrolysis in order to drive the reaction to completion. The haloacid thus obtained is then subjected to ammonolysis with aqueous ammonia, whereupon the desired aminoacid is obtained.

The following equations graphically illustrate the synthesis of the p-(aminoethoxy)benzoic acids embodying the invention:

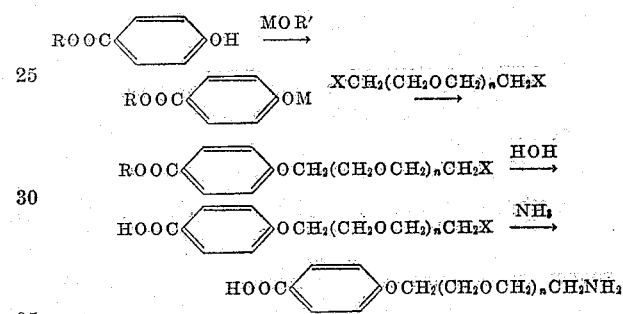

The invention is illustrated by the following examples of certain preferred embodiments thereof. It will be understood that the examples are illustrative only and are not intended to limit the scope of the invention unless otherwise specifically indicated.

EXAMPLE 1

*p-(2-bromoethoxy)benzoic acid, ethyl ester*

To a solution of sodium ethoxide, prepared by dissolving 25.3 g. (1.1 moles) of sodium in 300 cc. of absolute ethanol, was slowly added 166 g. (1.0 mole) of ethyl p-hydroxybenzoate. This solution was added over a 3-hour period to a stirred, refluxing solution containing 564 g. (3.0 moles) of ethylene dibromide in 300 cc. of ethanol. This mixture was stirred and refluxed for 2 hours longer, cooled and filtered. The sodium bromide residue was washed with ethanol, and the combined alcoholic solutions were fractionated under reduced pressure. The product distilled at 140–146°/2 mm. and melted at 56–62°. The yield was 152 g. (56%).

*Anal.*—Calcd. for $C_{11}H_{13}BrO_3$: Br, 29.3. Found: Br, 29.39.

*p-2-bromoethoxy)benzoic acid*

To a warm solution of 115 g. (0.42 mole) of ethyl p-(2-bromoethoxy)benzoate in 200 cc. of acetic acid was added 28 cc. (0.5 mole) of sulfuric acid in 108 cc. (6 moles) of water. While this solution was refluxed for 5 hours, the ethyl acetate which formed was distilled off. The product, which crystallized as the solution cooled, was collected and washed several times with water. It consisted of 71.5 g. (73% yield) of colorless platelets, M. P. 175–180°.

*Neutral equivalent.*—Calcd. for $C_9H_9BrO_3$: 245. Found: 244.

p-(2-aminoethoxy)benzoic acid

Aqueous ammonia (400 cc.) was cooled in an ice bath and saturated with gaseous ammonia. p-(2-bromoethoxy)benzoic acid (29.4 g.) was added, and the solution was heated in a 50° water bath for 3 days. When this solution was concentrated to a volume of about 150 cc., the amino acid began to crystallize. The product was collected and washed with ethanol. It weighed 17.4 g. (67% yield, calculated as the dihydrate) and melted at 263–265° (dec.). The melting point was found to be much lower when the temperature of the melting point stage was not increased rapidly. Recrystallization from water yielded colorless platelets, M. P. 268–269° (dec.).

*Anal.*—Calcd. for $C_9H_{11}O_3N \cdot 2H_2O$: N, 6.5; $H_2O$, 16.6. Found: N, 6.6; $H_2O$, 16.1.

EXAMPLE 2 p-(2-(2-chloroethoxy)ethoxy)benzoic acid, ethyl ester

The sodium salt of ethyl p-hydroxybenzoate was prepared as in Example 1, using 34.5 g. (1.5 moles) of sodium, 600 cc. of ethanol, and 249 g. (1.5 moles) of ethyl p-hydroxybenzoate. This solution was treated with 572 g. (4.0 moles) of 2,2′-dichlorodiethyl ether and was refluxed with stirring for 20 hours. Since filtration was difficult, the sodium chloride was removed by washing with water. The organic layer was then dried with sodium sulfate and fractionated under reduced pressure. The product, a colorless oil, was collected at 185–187°/4 mm.; $n_D^{20}$ 1.5268. It weighed 200 g. (49% yield).

*Anal.*—Calcd. for $C_{13}H_{17}O_4Cl$: C, 57.3; H, 6.3; Cl, 13.1. Found: C, 57.52; H, 6.39; Cl, 13.29.

p-(2-(2-chloroethoxy)ethoxy)benzoic acid

The ethyl ester was hydrolyzed as in the procedure given in Example 1; enough acetic acid was added to give a single phase at the boiling point of the solution. The product was obtained as small needles, M. P. 137–141°, in 88% yield. Recrystallization from benzene gave colorless needles, M. P. 140–142°.

*Anal.*—Calcd. for $C_{11}H_{13}O_4Cl$: C, 54.0; H, 5.3. Found: C, 53.95; H, 5.44.

p-(2-(2-aminoethoxy)ethoxy)benzoic acid

Ammonolysis of the above chloro acid was carried out as in Example 1 with a reaction time of 4 days. The solution was then concentrated on the steam bath to remove the ammonia, taken up in 400 cc. of water, and passed through a column containing Amberlite IR-4B. The resin was washed with water, and the combined aqueous effluents were decolorized with Darco and concentrated to a low volume. Addition of 2 volumes of ethanol caused crystallization of the amino acid, which was collected and washed with ethanol. The yield was 68% and the product melted at 225–228°. It was recrystallized several times by dissolving in hot water and adding 2 volumes of hot ethanol. The analytical sample melted with decomposition at 231–234° (lower melting point if the temperature of the melting point stage is raised slowly).

*Anal.*—Calcd. for $C_{11}H_{15}NO_4$: N, 6.2. Found: N, 6.05.

EXAMPLE 3

The amino acids which are obtained in accordance with this invention are useful in various applications wherein the bifunctional amino acids are commonly employed. Thus, a polyamide was prepared by heating p-(2-aminoethoxy)benzoic acid in an equal weight of cresol for 3 hours at 200–215° C. The polyamide was isolated by pouring the cresol solution into methyl alcohol or acetone. The polymer thus obtained melted at 160–170° C. and was readily extruded into films and fibres. The polymer also could be molded into a variety of molded articles.

Thus by means of this invention hitherto unknown aminoacids as defined herein are readily prepared by a simple synthesis.

Although the invention has been described in detail with particular reference to certain preferred embodiments thereof, variations and modifications can be effected within the spirit and scope of the invention as described hereinabove and as defined in the appended claims.

We claim:

1. A p-(aminoethoxy) benzoic acid from the group consisting of the compound of the formula

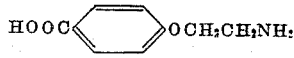

and the compound of the formula

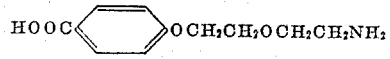

2. The compound of the formula

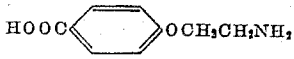

3. The compound of the formula

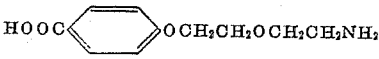

4. The method of making a p(aminoethoxy) benzoic acid which comprises reacting an alkali metal salt of a hydrolyzable ester of p-hydroxybenzoic acid with an excess of a dihalide of the formula $$XCH_2(CH_2OCH_2)_nCH_2X$$

wherein X represents a halogen atom and n is a member of the group consisting of 0 and 1, hydrolyzing the resulting haloethoxybenzoate to the corresponding haloethoxybenzoic acid, and reacting the haloethoxybenzoic acid with aqueous ammonia to form the p-(aminoethoxy) benzoic acid.

5. The method of making p-(2-aminoethoxy)benzoic acid which comprises reacting an alkali metal salt of a lower alkyl ester of p-hydroxybenzoic acid with ethylene dihalide, hydrolyzing the resulting p-(2-haloethoxy)benzoate to p-(2-haloethoxy)benzoic acid, and reacting said p-(2-haloethoxy)benzoic acid with aqueous ammonia to form p-(2-aminoethoxy)benzoic acid.

6. The method of making p-(2-(2-aminoethoxy)ethoxy)benzoic acid which comprises reacting an alkali metal salt of a lower alkyl ester of p-hydroxybenzoic acid with 2,2′-dihalodiethyl ether, hydrolyzing the resulting p-(2-(2-haloethoxy)ethoxy)benzoate to p-(2-(2-haloethoxy)ethoxy)benzoic acid, and reacting said p-(2-(2-haloethoxy)ethoxy)benzoic acid with aqueous ammonia to form p-(2-(2-aminoethoxy)ethoxy)benzoic acid.

No references cited.